Jan. 12, 1926.
J. W. SHEPARD
1,569,791
ROTARY ENGINE
Filed Sept. 7, 1922   3 Sheets-Sheet 1
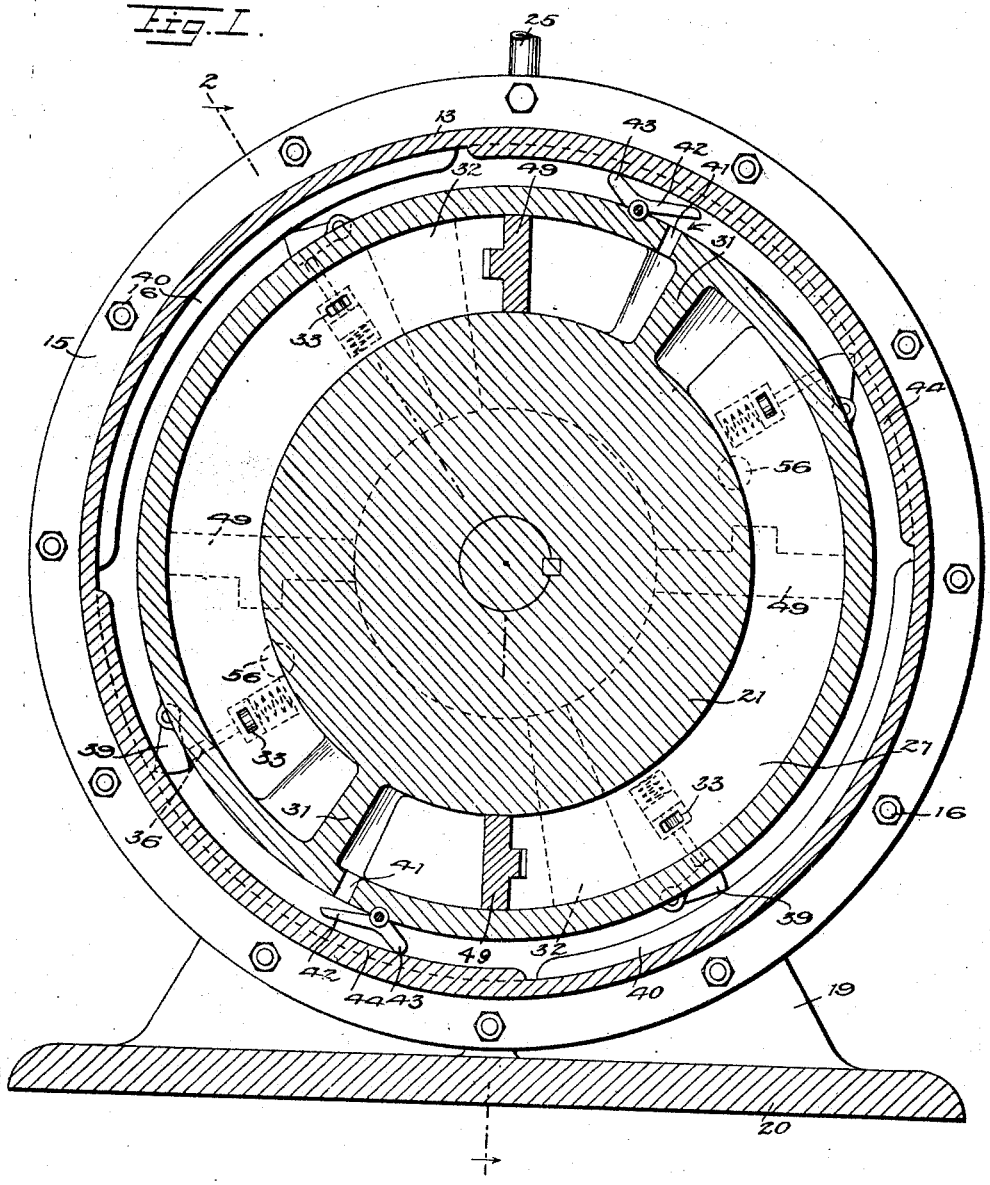
Fig. I.
WITNESSES
H. J. Walker
H. Harrison Abt
INVENTOR
J. W. Shepard
BY
Munn & Co
ATTORNEYS

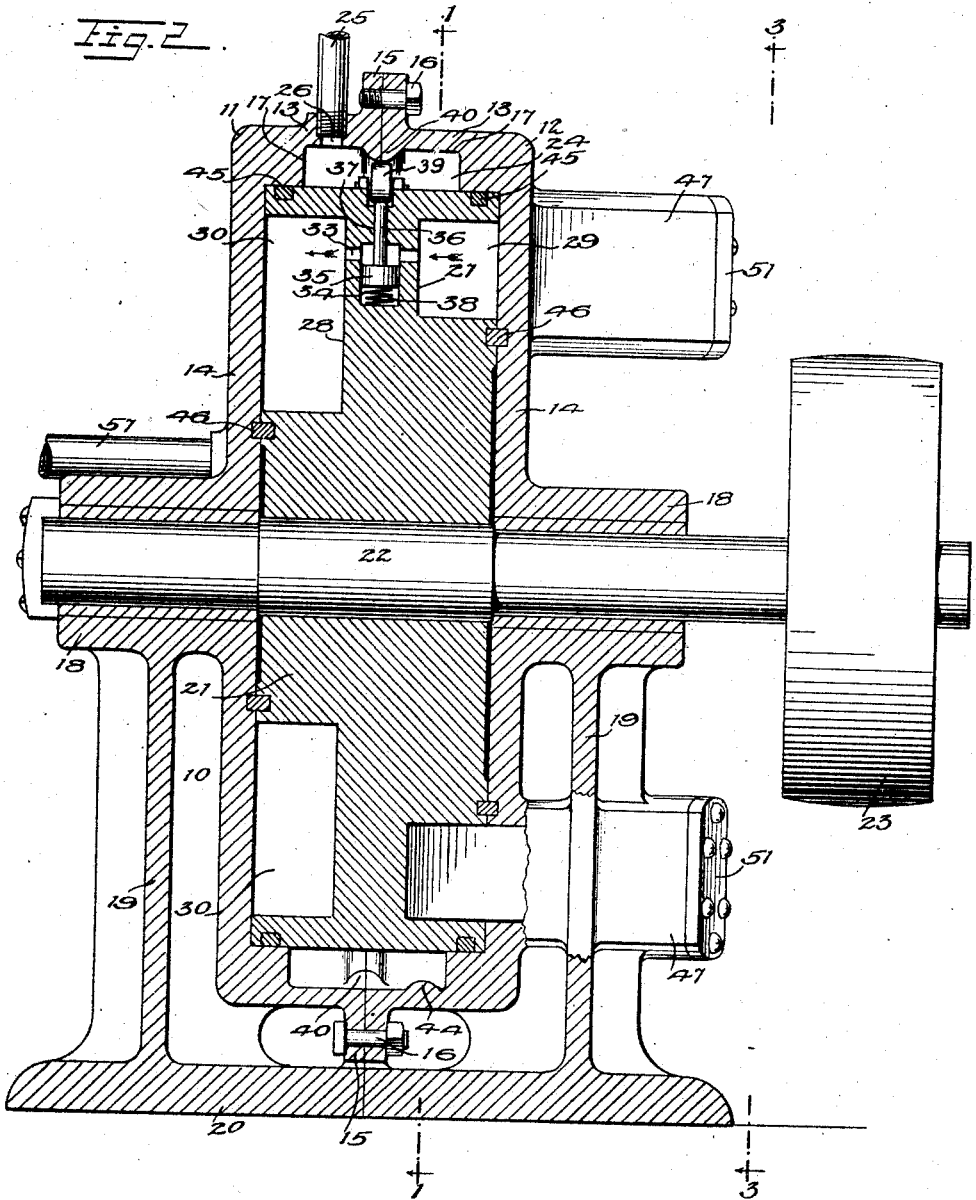

Jan. 12, 1926.  
J. W. SHEPARD  
ROTARY ENGINE  
Filed Sept. 7, 1922  
1,569,791  
3 Sheets-Sheet 3
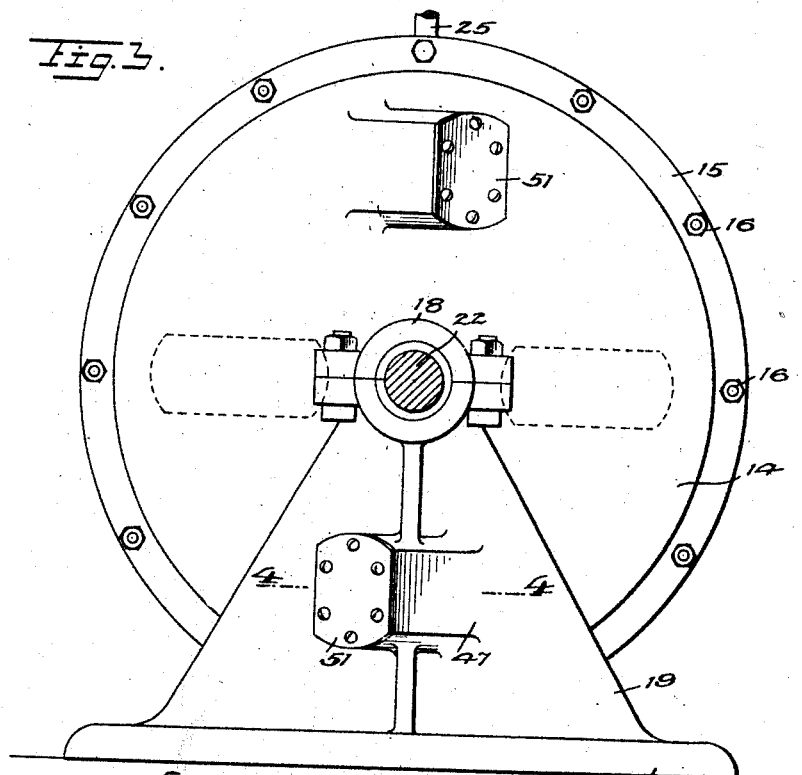
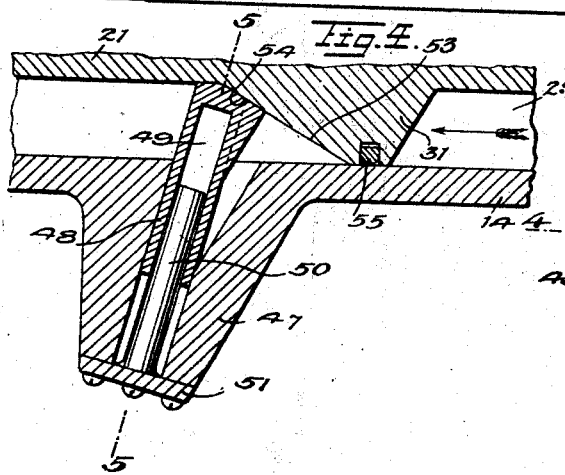
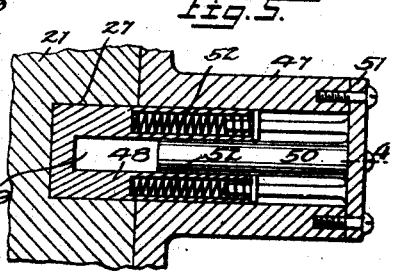
WITNESSES  
H. J. Walker  
H. Harrison
INVENTOR  
J. W. Shepard  
BY Munn & Co.  
ATTORNEYS Patented Jan. 12, 1926.

1,569,791

UNITED STATES PATENT OFFICE.

JOHN W. SHEPARD, OF TUCSON, ARIZONA.

ROTARY ENGINE.

Application filed September 7, 1922. Serial No. 586,676.

*To all whom it may concern:*

Be it known that I, JOHN W. SHEPARD, a citizen of the United States, and a resident of Tucson, in the county of Pima and State of Arizona, have invented a new and Improved Rotary Engine, of which the following is a full, clear, and exact description.

This invention relates to engines and refers more particularly to an improvement in a steam engine of the rotary type as distinguished from reciprocating turbine or internal combustion types.

One of the principal objects contemplated by the present invention is to provide a rotary engine which insures a maximum efficiency and maximum utility of the expansive action of steam between a stationary abutment and a rotor connected with the drive shaft.

As a further object the invention contemplates a rotary engine in which the torque is continuously applied to the drive shaft by the utilization of low pressure steam power in low pressure chambers after the same has been initially employed in high pressure chambers.

A still further object of the invention is the provision of a rotary engine in which the valve action is extremely simple and effective and acts automatically to properly time the opening and closing of the intake and exhaust ports and steam passages.

The invention further contemplates a rotary engine which employs a minimum of working parts which renders the same inexpensive to manufacture and to assemble and disassemble for repairs or replacement of parts.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a transverse sectional view through an engine constructed in accordance with the invention, the same being taken approximately on the line indicated at 1—1 of Fig. 2.

Fig. 2 is a longitudinal sectional view therethrough taken approximately on the line indicated at 2—2 of Fig. 1.

Fig. 3 is a sectional elevation taken approximately on the line 3—3 of Fig. 2.

Fig. 4 is a fragmentary horizontal sectional view taken approximately on the line 4—4 of Fig. 3.

Fig. 5 is a fragmentary vertical transverse sectional view taken approximately on the line indicated at 5—5 of Fig. 4.

Referring to the drawings by characters of reference, the engine includes a casing or stator 10 which preferably consists of a pair of transversely divided sections 11 and 12, each of which sections consists of a cylindrical wall 13 and a cylinder head 14 at the outer end. The open inner ends are flanged as at 15 and have passed therethrough securing elements or bolts 16. The cylindrical walls are provided with complementary annular recesses 17. Each of the cylinder heads 14 is provided with a tubular bearing boss 18 from which supporting standards 19 depend and connect with the base 20. A circular rotor 21 conforming substantially to the internal diameter of the casing is arranged within the same and is secured to a drive shaft 22 which extends through the rotor and the bearing bosses 18 for rotatably mounting the rotor and drive shaft. Any desired form of drive pulley 23 is secured to one of the protruding extremities of the drive shaft for transmitting the power. The outer periphery of the rotor defines together with the complementary recesses 17 an initial steam receiving chest 24 which communicates with a steam supply pipe 25 through an intake port 26 in one of the cylindrical walls 13. The rotor is provided in each of its opposite sides or ends with a pair of substantially semi-circular grooves 27 and 28, which define together with the cylinder heads 14 high pressure chambers 29 and low pressure chambers 30 disposed on opposite sides of the rotor. The grooves 27 are separated by webs 31 which constitute piston heads while the grooves 28 are separated by webs 32 which likewise constitute piston heads and serve to divide and define the pairs of high and low pressure chambers into individual compartments. Bypasses 33 establish communication between the high and low pressure chambers 29 and 30 and each of said by-passes is intersected by a valve chamber 34 in which a piston-like valve 35 is mounted for movement in opposite directions for respectively closing or opening the by-pass. Each valve is provided with a radially projecting valve stem 36 which extends through an opening 37 in the rotor. Coil springs 38 are arranged in the valve chambers at the inner side of the valve 35 for normally effecting the outward movement of the valves and valve stems to effect the closure of the by-passes. A pivoted valve actuating element 39 engages the outer end of each valve stem 36 and said valve actuating element is engageable with circumferentially spaced cams or ribs 40 formed on the inner periphery of the cylindrical walls 13 of the casing. Each of the high pressure chambers is provided with an intake port 41 which is normally closed by a pivoted flap valve 42 having an actuating arm 43. The actuating arm 43 of each flap valve is engageable with circumferentially spaced cams or ribs 44 on the inner periphery of the cylindrical wall 13 of the casing, said cam or rib 44 being spaced laterally with respect to the cam or rib 40 which is preferably located at the transverse center thereof. The rotor is provided on its outer periphery with packing rings 45 which engage the inner periphery of each cylindrical wall 13 on opposite sides of the steam chest. The rotor is further provided with packing rings 46 on the opposite ends or sides thereof immediately inside of the grooves 27 and 28 which define the high and low pressure chambers 29 and 30. Each cylinder head is provided with a pair of outwardly projecting bosses constituting housings 47 within which abutment plates 48 are mounted for sliding movement. The abutment plates are provided with longitudinal guide openings 49 into which guide rods 50 extend, said guide rods being carried by the cover plates 51 for the housings 47. The inner end of each abutment plate 48 is normally forced into the grooves 27 and 28 by means of springs 52. The abutment plates carried by each cylinder head are located at diametrically opposite points and the abutment plates for the low pressure chambers are disposed circumferentially opposite to the abutment plates of the high pressure chambers. The webs 31 and 32 constituting the piston heads are provided with outwardly inclined leading faces, while the abutment plates are provided with complementary inclined faces 54 which coact upon rotation of the rotor to effect an outward sliding movement of the abutment plate to permit of the passage of the webs or piston heads 31. Preferably each web is provided with a packing strip 55 to prevent leakage between the chambers.

In operation live steam is constantly supplied to the steam receiving chest 24 from the supply pipe 25 through the intake port 26 and the steam enters the high pressure chambers 29 through the intake ports 41 when the flap valves 42 are opened by the contact of the actuating arms 43 with the cams 44. As the steam enters the high pressure chambers, it expands between the abutment plates 49 and the webs or piston heads 31 to effect the rotation of the rotor in one direction. As the rotor continues to rotate, under the expansive action of the steam the actuating arms 43 disengage themselves or run off of the cams or ribs 44 permitting the flap valves to close and cut off the supply of steam to the high pressure chambers. Following the cutting off of the supply steam to the high pressure chambers, the valve actuating elements 39 will come into engagement with the ribs or cams 40 effecting inward movement of the valves 35 against the action of their springs 38 to open the by-passes 33, thereby permitting the steam from the high pressure chambers 29 to enter the low pressure chambers 30 where they will act against the inner ends of the abutment plates 49 thereof to produce a further expansive action against the piston heads or ribs 32 of the low pressure chambers. The continued rotation of the rotor will bring the actuating arms 43 into engagement with the succeeding ribs or cams 44, thus re-opening the flap valves 42 to admit of the intake of high pressure steam from the steam chest into the high pressure chambers. Following the intake of the steam to the high pressure chambers, the valve actuating elements 39 of the furthest advanced by-passes 33 will be cut off prior to the passage of the by-passes beyond the abutment plates 49 in the high pressure chambers, while the following by-passes 33 will remain opened to allow of the further expansion in the low pressure chambers. The leading face of the low pressure piston heads 32 will next effect the exhaust of the steam in the low pressure chambers through the exhaust ports 56 formed in the cylinder head 14 located at the same side with the low pressure chambers, said exhaust ports 56 communicating with exhaust pipes 57.

From the foregoing it will be seen that an extremely simple and inexpensive rotary steam engine has been provided in which a maximum utility of the expansive action of the steam is accomplished by successively by-passing the high pressure steam from high pressure chambers into low pressure chambers whereby the full expansive action is obtained. The high and low pressure expansive action in the respective high and low pressure chambers overlap in order to exert a continuous torque on the drive shaft, thus eliminating dead centers as is the case with reciprocating or internal combustion engines. The valve actions are extremely simple and automatic in their operation, the same being operable upon rotation of the rotor without the necessity of employing added cam shafts and valve lifters as is customary in the reciprocating and internal combustion type of engines.

I claim:

1. A rotary engine comprising a stator having an annular steam chest, a rotor in the stator and forming the inner wall of the steam chest, one side of said rotor being formed inwardly of the periphery of the rotor with an annular groove defining a high pressure chamber, the other side of the rotor being formed inwardly of the periphery of the rotor with an annular groove of a greater volume than said first named groove, and forming a low pressure chamber, there being transverse openings in the rotor for establishing communication between the high and low pressure chambers, spring actuated valves for normally closing said transverse openings, cams carried by the stator for periodically unseating said valves and thereby periodically establishing communication between the oppositely located high and low pressure chambers.

2. A rotary engine comprising a stator having an annular steam chest, a rotor in the stator and forming the inner wall of the steam chest, one side of said rotor being formed inwardly of the periphery of the rotor with an annular groove defining a high pressure chamber, the other side of the rotor being formed inwardly of the periphery of the rotor with an annular groove of a greater volume than said first named groove and forming a low pressure chamber, there being transverse openings in the rotor for establishing communication between the high and low pressure chambers, spring actuated valves for normally closing said transverse openings, cams carried by the stator for periodically unseating said valves and thereby periodically establishing communication between the oppositely located high and low pressure chambers, abutments carried by said stator and extending into the high and low pressure chambers, and means whereby to move said abutments out of the path of travel of the rotor at intervals.

3. A rotary steam engine comprising a closed casing embodying a cylindrical wall having an internal peripheral recess, heads closing the opposite ends of the cylindrical wall, a rotor mounted within said casing and closing said peripheral recess to define a steam chest having an intake communicating with a source of steam supply, the opposite sides of the rotor each having a pair of semi-circular grooves defining together with the cylindrical heads a pair of high and low pressure cylinders located respectively at opposite sides of the rotor and having by-passes extending therebetween, controlling valves for said by-passes, said rotor having intake ports extending between the high pressure chambers and the steam chest, valves for controlling said intake ports, said casing having exhaust ports located in the cylinder heads at the same side with the low pressure chambers, abutments carried by the cylinder heads and extending into the high and low pressure chambers, and means operable upon rotation of the rotor for successively actuating the valved intake and by-pass ports to effect the initial introduction of live steam to the high pressure chambers, the subsequent passage of the same from the high pressure to the low pressure chambers, and the final escape of the same from the low pressure chambers through the exhaust ports.

4. A rotary engine including a casing having intake and exhaust ports, a drive shaft extending through the casing, a rotor secured to the drive shaft and having concentric annular grooves in the opposite sides thereof, webs located at diametrically opposite points in each groove, abutments carried by the casing and extending into the grooves, means for normally effecting the projection of the abutments into the grooves and for permitting of the retraction of the same therefrom by the contact of the webs therewith, said grooves, the casing, the webs and abutments defining a pair of chambers in each side of the rotor, means operable upon rotation of the rotor for successively feeding an expansive fluid into the chambers of one side, by-passing the fluid to the chambers on the opposite side, and exhausting the fluid from said latter chambers whereby to produce a continuous torque on the drive shaft.

5. A rotary engine including a casing having intake and exhaust ports, a drive shaft extending through the casing, a rotor secured to the drive shaft and having concentric annular grooves in the opposite sides thereof, webs located at diametrically opposite points in each groove, abutments carried by the casing and extending into the grooves, means for normally effecting the projection of the abutments into the grooves and for permitting of the retraction of the same therefrom by the contact of the webs therewith, said grooves, the casing, the webs and abutments defining a pair of chambers in each side of the rotor, the chambers of one side of the rotor having intake ports communicating with the casing intake, valves for controlling said intake ports and operable upon rotation of the rotor for successively feeding an expansive fluid into said chambers, the said chambers on opposite sides of the rotor having by-pass ports, valves for controlling the same operable upon rotation of the rotor for by-passing the fluid to the opposite chambers and for permitting of the exhaust of the fluid from said latter chambers at predetermined periods in the cycle of rotation of the rotor.

JOHN W. SHEPARD.